June 25, 1940. H. SCHLACHT Re. 21,494

WORLD CLOCK

Original Filed Feb. 20, 1935 3 Sheets-Sheet 1

INVENTOR.
Herman Schlacht
BY Cornelius Kalinski
ATTORNEY.

June 25, 1940. H. SCHLACHT Re. 21,494

WORLD CLOCK

Original Filed Feb. 20, 1935 3 Sheets-Sheet 2

INVENTOR.
Herman Schlacht

BY Cornelius Zalvis Lee

ATTORNEY.

June 25, 1940. H. SCHLACHT Re. 21,494

WORLD CLOCK

Original Filed Feb. 20, 1935 3 Sheets-Sheet 3

INVENTOR.
Herman Schlacht

BY Cornelius Zalewska

ATTORNEY.

Reissued June 25, 1940

Re. 21,494

UNITED STATES PATENT OFFICE 21,494

WORLD CLOCK

Herman Schlacht, Woodhaven, N. Y.

Original No. 2,070,687, dated February 16, 1937, Serial No. 7,340, February 20, 1935. Application for reissue February 15, 1939, Serial No. 256,518

15 Claims. (Cl. 58—43)

My invention relates particularly to clocks to be used in connection with all-wave radio sets. With the advent of these sets there has risen a demand for a timepiece which would enable one to determine quickly the time in the principal cities of the world. I am aware of the fact that numerous devices have been made for this purpose and those with which I am familiar are subject to the objection that they are complicated and too crowded in their information to be easily read.

My invention has for its object to provide a very simple device of this character and which will enable the user to obtain at a glance the required information.

My means of accomplishing the foregoing objects may be more readily understood by having reference to the accompanying drawings which are hereunto annexed and are a part of this specification, in which—

Similar reference numerals refer to similar parts throughout the entire description.

Figure 1:
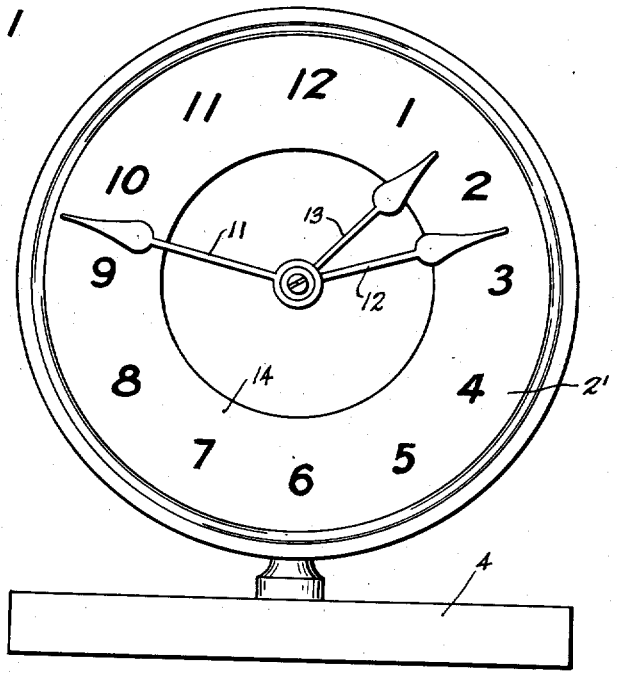
Fig. 1 is a front elevation of my improved clock.
Figure 2:
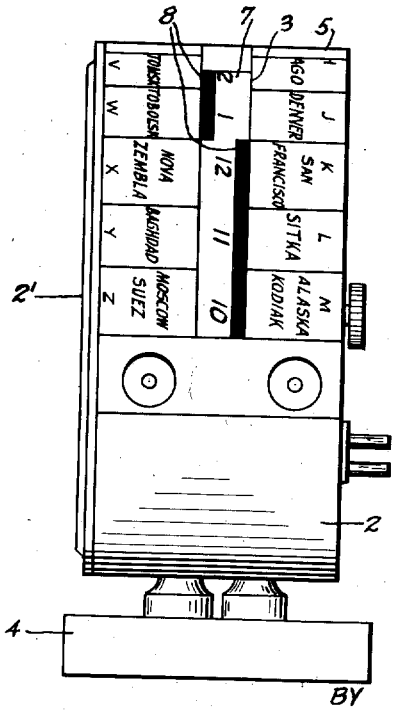
Fig. 2 is a side elevation of the same.
Figure 3:
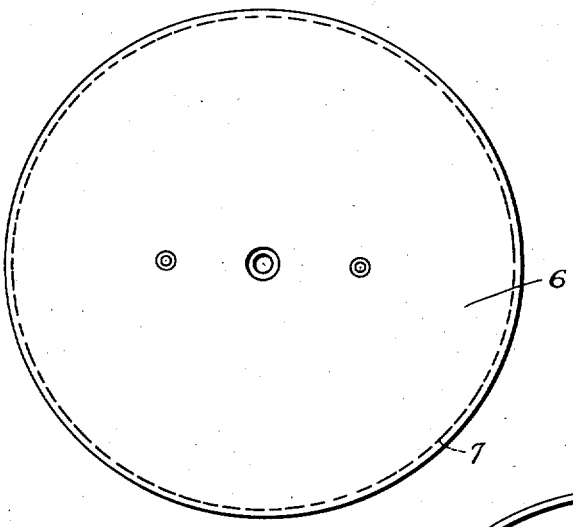
Fig. 3 is a front elevation of one of the details.
Figure 4:
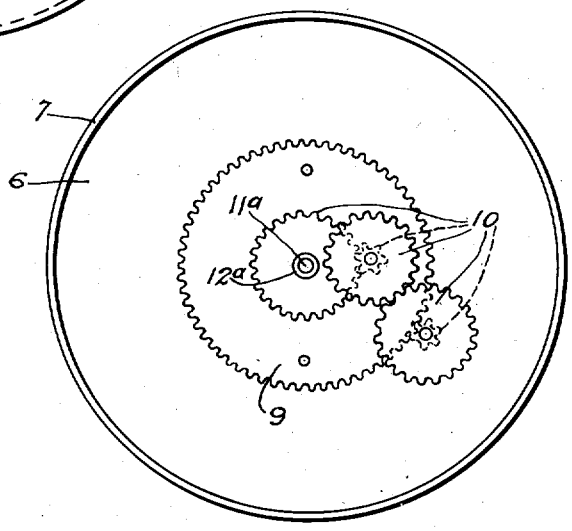
Fig. 4 is a rear view of the same together with the gear train connected therewith.
Figure 5:
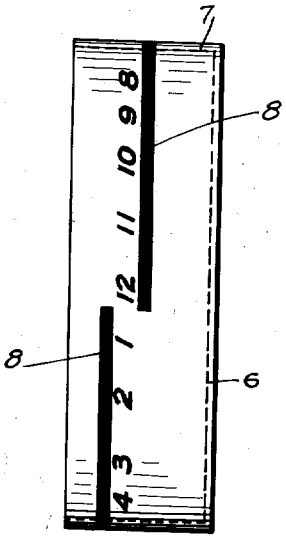
Fig. 5 is a side view of the same.
Figure 6:
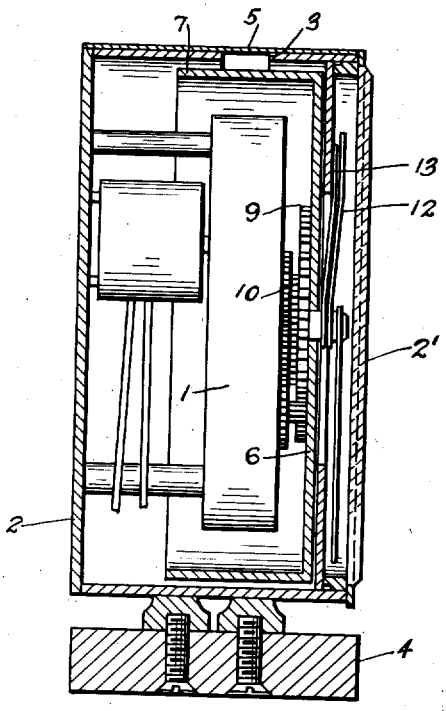
Fig. 6 is a vertical sectional view showing the interior construction.
Figure 7:
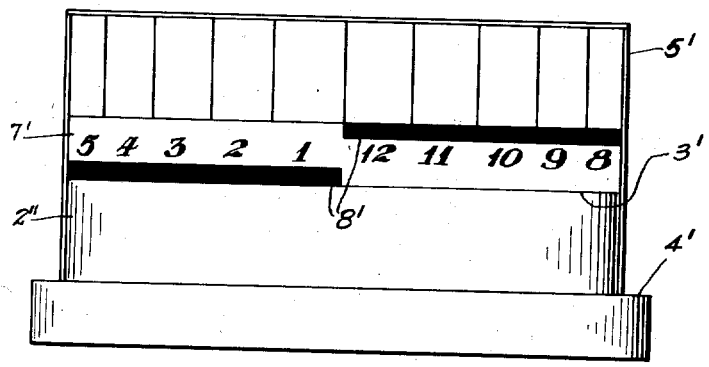
Fig. 7 is a side elevation of a modified form of my invention.

As shown in the drawings, I employ a standard clock movement 1. To this I fit my improvement. The movement 1 is mounted in a case 2, provided with the usual crystal 2′. In this case I cut a slot 3 which extends from one side of the base 4 around to the other side of the base. This slot 3 may be closed with any desired kind of transparent material 5. I have found Celluloid serves the purpose very well. I provide a disc 6 having a circumferential flange 7 which fits inside of the case 2 and is provided with two sets of numerals 1 to 12 and 1 to 12 which may be printed upon a strip of paper which can be pasted or otherwise secured to the periphery of the flange 7. A stripe 8 is printed above one set of numerals and below the other to indicate a. m. and p. m. respectively. Upon the inside of the disc and adjacent a central opening provided for the hand-operating shafts of the clock I mount a gear 9 which meshes with the hour hand gear train 10. The minute hand 11 is conventionally fixed to the center shaft 11*a* and the hour hand 13 is conventionally supported on the tubular shaft 12*a*. The ratio of the gearing is such that the disc 6 will be rotated once in 24 hours. I provide an annulus 14 which has the numerals for the face of the clock which is mounted intermediate the crystal 2′ and the outer surface of the disc 6. The hands traverse this annular clock face in the usual and conventional manner. I then scribe upon the exterior of the case 2 adjacent the slot 3 and on each side thereof a plurality of pairs of time zones arranged in a semi-circle, each pair bearing in opposition the names of various cities such as Kodiak, Moscow, Sitka, Baghdad, San Francisco, Nova Zembla, etc., their positions being determined by their longitude. Those above the stripe 8 are located in one hemisphere of the earth, while those below are in the opposite one. As a result when one wishes, for example, to determine the time at Singapore, when it is 9 o'clock in New York city, by glancing at the side of the clock for the city in question and comparing it with the numerals on the disc he will be at once furnished with the time at that city. If the stripe 8 is above the numerals on the flange 7, it will be the hour indicated in a. m., on the other hand if the stripe 8 is below the numerals then it is the time indicated in p. m. It should be here noted that the places in the time zones immediately adjacent the stripe have the time indication according to whether the stripe is an a. m. or p. m. stripe while the places located in the same time zones but on the opposite side of the time flange 7 and on the same side of the clock are the places which have time which is 12 hours distant from the places indicated on the first side, namely if it is 2 o'clock p. m. in Tomsk, then it will be at the same instant 2 a. m. in Chicago. It will be obvious that by this arrangement I can have the various places in print so large it can be read without any difficulty. If it is desired to have a greater number of places, letters of the alphabet may be printed, indicating the smaller cities, as shown in the time zones, and a book can be prepared giving the smaller places for these time zones. In some cases it may be found desirable to have the case mounted, as shown in Fig. 7 and when this is done the numerals may, if desired, be 1 to 24 or they can be as shown in the other figures. It will be apparent this may be done without departing from the spirit of my invention. In this form the case 2″ is laid on its side resting on a base 4′. A slot 3′ is cut in the case. It may be covered with Celluloid 5′. A disc similar to the disc 6 is provided having a circumferential flange 7′ on which may be printed the numerals. A stripe 8′ divides the a. m. from the p. m. time.

For those locations which have daylight saving time I provide a third hand 12, rigid with respect to the hand 13 and pointing one hour later than the latter; thus the clock will show the daylight saving time for the locality where the clock is used yet the hand 13 will give the standard time.

Having described my invention what I regard as new and desire to secure by Letters Patent is:

1. A world clock comprising a movement, a cylindrical casing having a circumferential slot cut therethrough, a disc having a circumferential flange thereon, two sets of numerals each from one to twelve arranged around said flange and visible through the slot, semi-circumferential lines on the flange to indicate one set of numerals as a. m. and the other p. m., means actuated by the clock movement to rotate said disc once in twenty-four hours, and a plurality of subdivisions on the periphery of the casing to indicate respective cities.

2. A world clock comprising a movement, a cylindrical casing having a circumferential slot cut therethrough, a transparent closure for said slot, a rotatable disc having a circumferential flange thereon, two sets of numerals each from one to twelve arranged around said flange and visible through said slot, semi-circumferential means to indicate one set of numerals as a. m. and the other p. m., means actuated by the clock movement to rotate said disc once in twenty-four hours, and a plurality of parallel subdivisions on the periphery of the casing adjacent the slot to indicate respective cities.

3. A world clock comprising a movement, a cylindrical casing having a circumferential slot cut therethrough, a rotatable disc having a circumferential flange thereon visible through the slot, two sets of time numerals each from one to twelve arranged around said flange behind the slot, means actuated by the clock movement to rotate said disc once in twenty-four hours, a plurality of parallel subdivisions on the periphery of the casing to indicate respective cities, the said subdivisions being arranged adjacent the slot and cooperating with the numerals for determining comparative times in different localities, and offset semi-circumferential lines on the flange to distinguish between a. m. and p. m.

4. A world clock comprising a movement, a cylindrical casing having a slot cut therethrough, a transparent closure for said slot, a rotatable disc having a circumferential flange thereon rotatable below the slot and visible therethrough, two sets of numerals each from one to twelve arranged around said flange and in line with the slot, offset parallel semi-circumferential lines on the flange adjacent the numerals to indicate one set as a. m. and the other p. m., means actuated by the clock movement to rotate said disc once in twenty-four hours, a plurality of parallel circumferentially arranged subdivisions on the periphery of the casing and upon opposite sides of the slot to indicate respective localities, and a plurality of characters in each subdivision.

5. A world clock including a movement, a cylindrical casing having a plurality of pairs of time zones determined by longitude and displayed in a semi-circle in opposed positions, each of said zones containing a geographical name of a city, two semi-circular stripes interposed between said zones and lying in different planes, the zones on one side of each stripe indicating a. m., and the other p. m., and means actuated by said clock movement to rotate said stripes.

6. A world clock including a movement, a cylindrical casing having a plurality of pairs of time zones determined by longitude and displayed in a semi-circle in opposed positions, each of said zones containing a geographical name of a city, two semi-circular stripes interposed between said zones and lying in different planes, the zones on one side of each stripe indicating a. m. and the other p. m., a set of numerals arranged adjacent each of said stripes and located with one numeral adjacent each pair of zones, and means actuated by said clock movement to move said numerals and said stripes in units of time measurement.

7. A world clock comprising a movement, a casing having a slot therethrough, a rotary member, two sets of numerals each from one to twelve arranged around said rotary member and visible through the slot, lines on the rotary member to indicate one set of numerals as a. m. and the other p. m., means actuated by the clock movement to rotate said rotary member once in twenty-four hours, and a plurality of pairs of time zones on the casing with the two zones of each pair juxtapositioned on opposite sides of said slot and respectively indicating cities geographically spaced apart twelve hours.

8. A world clock comprising a movement, a casing having a slot therethrough, a rotary member, two sets of numerals each from one to twelve arranged around said rotary member and visible through said slot, means to indicate one set of numerals as a. m. and the other p. m., means actuated by the clock movement to rotate said rotary member once in twenty-four hours, and a plurality of pairs of time zones on the casing with the two zones of each pair juxtapositioned on opposite sides of said slot and respectively indicating cities geographically spaced apart twelve hours.

9. A world clock comprising a movement, a casing having a slot therethrough, a transparent closure for said slot, a rotary member visible through the slot, two sets of numerals each from one to twelve arranged around said rotary member and in line with the slot, offset parallel lines on the rotary member adjacent the numerals to indicate one set as a. m. and the other p. m., means actuated by the clock movement to rotate said rotary member once in twenty-four hours, a plurality of parallel subdivisions on the casing and upon opposite sides of the slot to indicate respective localities, and a plurality of characters in each subdivision.

10. A world clock including a movement, a casing having a plurality of pairs of time zones determined by longitude with the zones of each pair displayed in opposed relation, each of said zones containing a designation of geographical location, stripes interposed between the zones of the several pairs and positioned in offset relation to one another, the zones on one side of each stripe indicating a. m. and the other p. m., and means actuated by said clock movement to move said stripes in accordance with the passage of time.

11. A world clock including a movement, a casing having a plurality of pairs of time zones determined by longitude with the zones of each pair displayed in opposed relation, each of said zones containing a designation of geographical location, stripes interposed between the zones of the several pairs and positioned in offset relation to one another, the zones on one side of each stripe indicating a. m. and the other p. m., a set of numerals arranged adjacent each of said stripes and located adjacent said pairs of zones, and means actuated by said clock movement to move said numerals and said stripes according to the passage of time.

12. A world clock including a movement, a clock casing provided therein with a slot, a member within said casing and operatively connected with the movement to cause the surface of said member to travel past the slot in juxtaposed relation thereto and in successive cycles of twenty-four hours each, a plurality of pairs of time zones delineated on the casing in juxtaposition with the slot therein with each pair of zones respectively indicating geographical localities on substantially diametrically opposite sides of the world, hour indications delineated on the movable member and arranged to register in proper time relation with the several pairs of zones in accordance with the operations of the movement, and means also on the movable member to indicate whether the hour indication appropriate to any particular time zone is a. m. or p. m.

13. A world clock including a movement, a clock casing having therein an elongated slot provided, along its margin, with a succession of pairs of time zones respectively indicating localities on substantially diametrically opposite sides of the world, a member operatively connected with the movement to be driven in timed relation thereto and thereby, hour designations on said member, successive groupings of which are adapted to be consecutively juxtaposed with the several pairs of time zones in accordance with the timed operations of the movement, and means to indicate whether the hour indication appropriate to any particular time zone is a. m. or p. m.

14. A world clock including a movement, a stationary geographical scale comprising a succession of pairs of time zones with the zones of each pair juxtaposed with respect to one another and respectively indicating localities on substantially diametrically opposite sides of the world, a member operatively connected with said movement to be driven in timed relation thereto and thereby, hour designations on said member arranged to individually register in proper time relation with the several pairs of time zones in accordance with the operations of the movement, and means to indicate whether the hour indication appropriate to any particular time zone is a. m. or p. m.

15. A world clock comprising a movement, a casing having a slot therethrough, a rotary member, two sets of numerals each from one to twelve arranged around said rotary member and visible through the slot, offset lines on the rotary member to respectively indicate one set of numerals as a. m. and the other p. m., means actuated by the clock movement to rotate said rotary member once in twenty-four hours, and a plurality of pairs of time zones on the casing with the two zones of each pair juxtapositioned on opposite sides of said slot and respectively indicating cities geographically spaced apart twelve hours.

HERMAN SCHLACHT.